United States Patent [19]
Silventoinen et al.

[11] Patent Number: 6,108,553
[45] Date of Patent: Aug. 22, 2000

[54] MOBILE STATION POSITIONING SYSTEM

[75] Inventors: Marko Silventoinen; Timo Rantalainen, both of Helsinki; Mika Raitola, Espoo; Jukka Tapio Ranta, Salo, all of Finland

[73] Assignee: Nokia Mobile Phones, Ltd., Salo, Finland

[21] Appl. No.: 08/720,622

[22] Filed: Oct. 2, 1996

[30] Foreign Application Priority Data

Oct. 3, 1995 [FI] Finland ..................................... 954705

[51] Int. Cl.$^7$ ...................................................... H04Q 7/22
[52] U.S. Cl. .......................................... 455/456; 342/463
[58] Field of Search ................................... 455/440, 456, 455/457; 342/463, 464, 465

[56] References Cited

U.S. PATENT DOCUMENTS

| 5,293,645 | 3/1994 | Sood ........................................ 455/456 |
| 5,508,708 | 4/1996 | Ghosh et al. ............................ 455/456 |
| 5,629,710 | 5/1997 | Sawada ................................... 455/456 |

FOREIGN PATENT DOCUMENTS 0 341 738 A2  11/1989  European Pat. Off. .
500 769        8/1994   Sweden .

*Primary Examiner*—Andrew M. Dolinar
*Attorney, Agent, or Firm*—Perman & Green, LLP

[57] ABSTRACT

The invention relates to a method for determining the position of a mobile station, a positioning system and a mobile station. According to the invention, a mobile station (21) receives signals from at least two base stations (22, 23, 24) and determines time differences of the clocks of the received signals. The mobile station (21) sends information about the time differences to a positioning service center (26) of the mobile communication system which calculates the position of the mobile station (21) on the basis of the time difference information and base station coordinates and clock information. With the method it is possible to measure signals the strengths of which remain below the minimum decoding level. According to the invention, it is also possible to measure bursts containing short training sequencies to improve timing measurement accuracy and measuring speed. The time difference measurement results obtained are transmitted from the mobile station to a base station advantageously by encoding the results in a signalling channel (SACCH) burst. The method enables quick position measuring at short intervals without substantially increasing the load on the mobile station or on the air interface.

9 Claims, 5 Drawing Sheets

MOBILE STATION POSITIONING SYSTEM

BACKGROUND OF THE INVENTION

1. Field of the Invention

The invention relates to a mobile station positioning method and a positioning system and a mobile station implementing the method. In addition, the invention relates to a method for transmitting mobile station position information from a mobile station to a base station and to a mobile communication system, and a mobile station implementing the method. The method can be advantageously applied in a digital time-division mobile communication system, such as the GSM (Global System for Mobile Communications) mobile telephone network.

2. Description of the Prior Art

The position information of a mobile station can be used for many purposes:

pricing of calls can be performed according to the position of a mobile station, whereby calls made from a home environment, for example, can be cheaper;

when an emergency call is made from a mobile station, it is possible to determine the position of that mobile station;

the user of a mobile station may need information about his/her position e.g. when travelling, police and other authorities can use the position information to locate a stolen mobile station or to trace a missing person, for example.

In addition, a mobile communication system can utilize the position information when changing serving base stations. Up to the present, the change of serving base stations has required the use of other information measured from the transmission channel, such as signal attenuation on the transmission channel, because the position information available is not accurate enough for the purpose. Apart from the accuracy, the position information used for the change of serving base stations has to be nearly real-time, so the position measurement has to be performed quickly and at short intervals.

There are several known methods to locate a mobile station. According to the prior art, the mobile communication system knows which is the base station in whose coverage area the mobile station is located, and so the position of the mobile station can be determined with the accuracy of roughly the cell size in the system. Since the cell size in the system may be large, say 100 km$^2$, the accuracy of this position information is too modest for most applications.

A method is known from publication [1] WO 92/05672 wherein the distance of a mobile station from a base station is determined on the basis of the propagation delay of a signal transmitted between the mobile station and the base station. FIG. 1 illustrates the operating principle of such a method. By measuring the propagation delay of a signal between a base station 1 and a mobile station 14, it is obtained a distance estimate $d_1$ for the distance between the mobile station and the base station. Because of a certain measuring accuracy of the distance measurement, the assumed location of the mobile station is a ring-shaped area the width of which depends on the time delay measuring accuracy. A corresponding propagation delay measurement can be performed for a signal between the mobile station and other base stations. The result is one ring-shaped location area per each base station used in the measurement. In the situation illustrated by FIG. 1, the propagation delays between the mobile station and base station 11, mobile station and base station 12, and mobile station and base station 13 produce distance estimates $d_1$, $d_2$ and $d_3$ which correspond to the ring-shaped areas 16, 17 and 18. The rings intersect at area 19, which is the mobile station location area obtained from the three propagation delay measurements. Thus, the location of the mobile station can be determined to be an area whose order of dimension is the measuring accuracy.

The method based on a propagation delay measured from a signal between a mobile station and a base station has the disadvantage that the mobile station has to establish a connection with every base station for which the propagation delay is to be measured. Then the operating range for the position measurement stays small because in most cases it is not possible to establish connections to a sufficient number of base stations because of long distances, attenuating obstacles or low transmission power, for example. If the position information has to be continuously updated, the transmission of the position information puts a considerable load on the connection capacity of the mobile communication system. In addition, the high amount of data transmitted makes the measuring slow. It is also a problem of the method that errors in the absolute timing accuracy of the mobile station produce errors in the positioning result obtained.

In addition, a method is known from publication [2] EP 398773 wherein a mobile station receives from a mobile communication system information about clocks and location coordinates of base stations situated in the vicinity of the mobile station. Then the mobile station measures the time differences of the signals received from said base stations and determines the position of the mobile station on the basis of measured time differences, base station clocks and position coordinates and the position location algorithm stored in the mobile station. The publication does not describe in detail how the method would be implemented in a mobile communication system. The principle of measurement based on time differences is described in more detail in connection with the description of the method according to the invention.

The method described in publication [2] has the disadvantage that the mobile station has to perform a considerable amount of processing related to the calculation of position coordinates, which takes away processor capacity from other functions of the mobile station. Furthermore, the algorithms of the location method used in the mobile communication system have to be stored in the mobile station, whereby it becomes very difficult to make changes in the method since the mobile station base of the system needs then to be updated. In addition, there is the disadvantage that it is primarily the system, and not the mobile station, that needs the position information, which means that the position coordinates calculated by the mobile station have to be transmitted from the mobile station to the system. Similarly, the base station must continuously transmit information to the mobile station about the position coordinates and clocks of the nearest base stations. As the position information contains a fair amount of data, the transmission of said information would considerably consume the transmission capacity of the system.

Problem to be Solved

According to what has been expressed above, mobile station position information can be applied in many ways, but the characteristics of the prior art solutions do not meet the requirements of the applications.

Object of the Invention

The object of the invention is to provide a method and a system for determining the position information of a mobile station, and a mobile station implementing the method, avoiding the aforementioned disadvantages of the prior art.

SUMMARY OF THE INVENTION

An idea of the invention is to calculate the position of a mobile station on the basis of the observed time difference (OTD) between signals received from at least two base stations. The time difference measurement is advantageously performed in the mobile station and the measurement result is transmitted to the serving base station. Time difference measurement can be advantageously implemented using received bursts the strengths of which are below the decoding level of the mobile station. Transmission of the measurement result advantageously occurs on the signalling channel. After the transmission of measurement results, a positioning service center (PSC) in the mobile communication network determines on the basis of the measurement results and base station location coordinates and clock information an estimate for the location coordinates of the mobile station.

The method according to the invention is characterized by what is expressed in the characterizing part of claim 1. The positioning system according to the invention is characterized by what is expressed in the characterizing part of claim 6. The mobile station according to the invention is characterized by what is expressed in the characterizing part of claim 7. Advantageous embodiments of the invention are described in the sub-claims.

BRIEF DESCRIPTION OF THE DRAWINGS

The invention is described with reference to the accompanying drawing, in which.

DETAILED DESCRIPTION OF THE PREFERRED EMBODIMENT(S)

Below it is first described the operating principle of the positioning method based on time difference, and the operating principle of the positioning method according to the invention. Then it is described a method according to the invention for receiving signals transmitted from base stations and a method according to the invention for measuring the time difference. Next, it is described an implementation according to the invention for processing a signal in a receiver. Then it is described a signalling arrangement according to the invention for transmitting the measurement information from the mobile station to the base station. Finally, it is described what advantages the solution according to the invention has as compared to the prior art. In the description of the embodiments illustrated, a reference is made to the GSM system which is disclosed in more detail in [3] The GSM System for Mobile communications by M. Mouly and M-B. Pautet, 1992.

Figure 1:
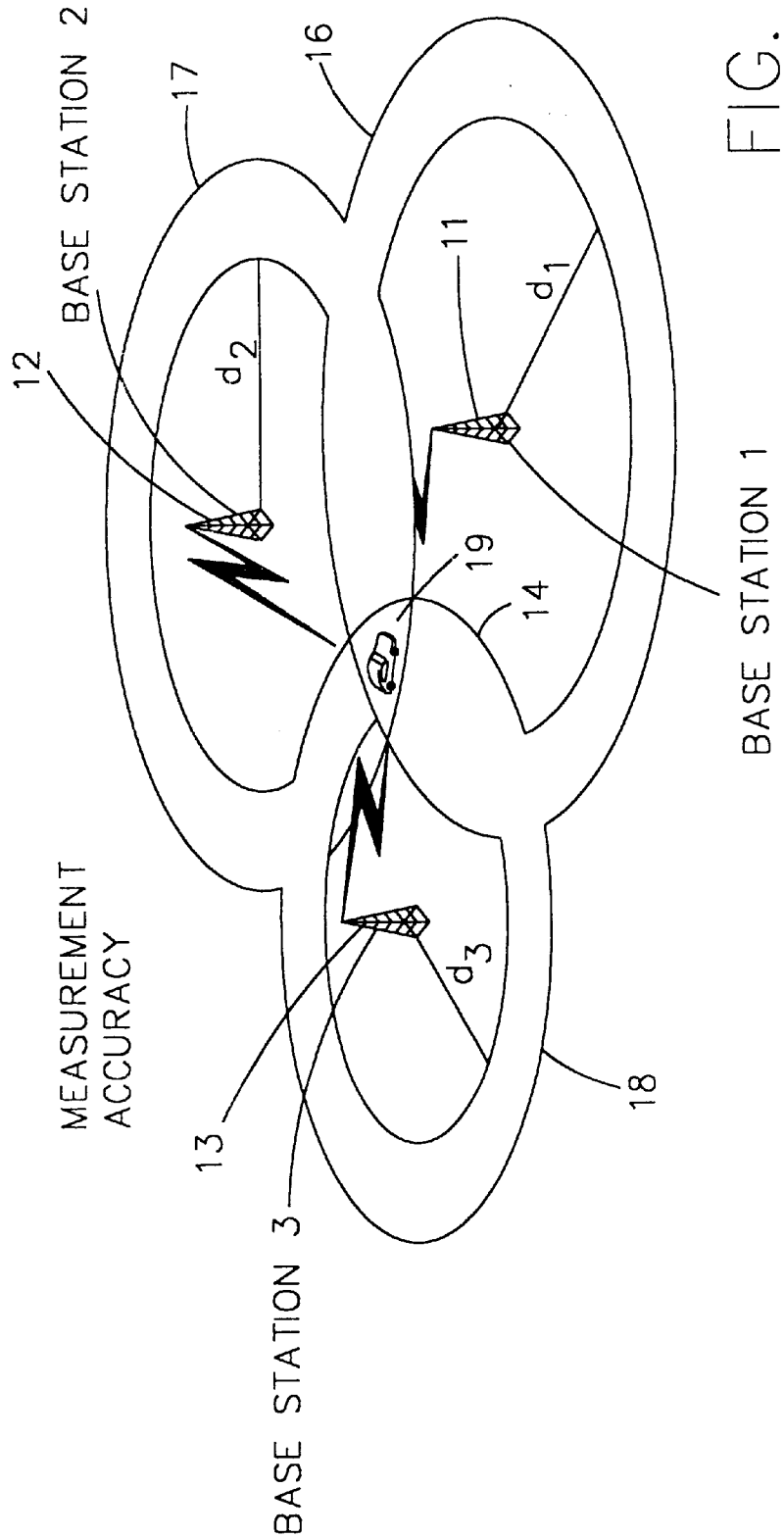
FIG. 1 shows a method according to the prior art for determining the position of a mobile station, based on measuring the propagation delay between a base station and the mobile station.
Figure 2:
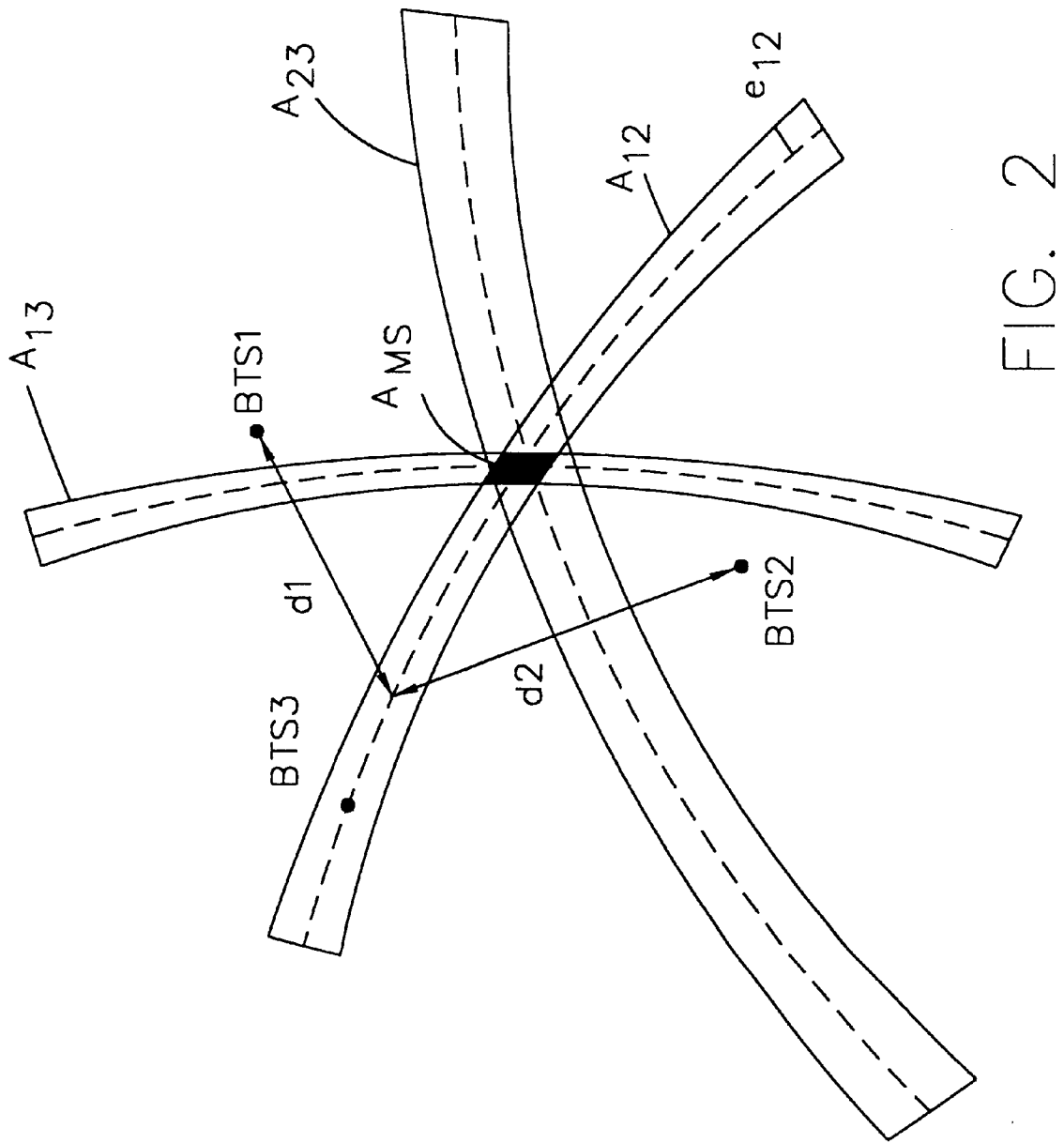
FIG. 2 shows a known positioning method based on time difference, utilized in the solution according to the invention.

FIG. 2 illustrates the operating principle of the measurement based on time difference. In it, a mobile station receives signals from several base stations, in this case from three base stations BTS1, BTS2 and BTS3. An estimate for the position of the mobile station is determined by means of the time difference of arrival (TDOA) of signals received from the base stations, whereby it is possible to calculate by means of the time difference between signals received from two base stations the difference d1–d2 between the distance d1 between the mobile station and a first base station and the distance d2 between the mobile station and a second base station. Then those potential positions of the mobile station in which the value of the distance difference equals d1–d2 constitute a hyperbola-shaped curve, which represents the potential positions of the mobile station. In FIG. 2, this curve is shown as a dashed line. Since the measurement result has a certain error margin, the location area of the mobile station is in reality a band between two hyperbolas, the width of the band depending on the error margin of the measurement result. When signals are received from at least three base stations BTS1, BTS2 and BTS3, the result consists of several location areas $A_{12}$, $A_{13}$ and $A_{23}$, and the mobile station is then located at the intersection $A_{MS}$ of those areas. Determining a restricted location area requires time difference measurement for signals received from at least three base stations unless other methods such as propagation delay measurement are used in addition to the time difference measurement.

Figure 3:
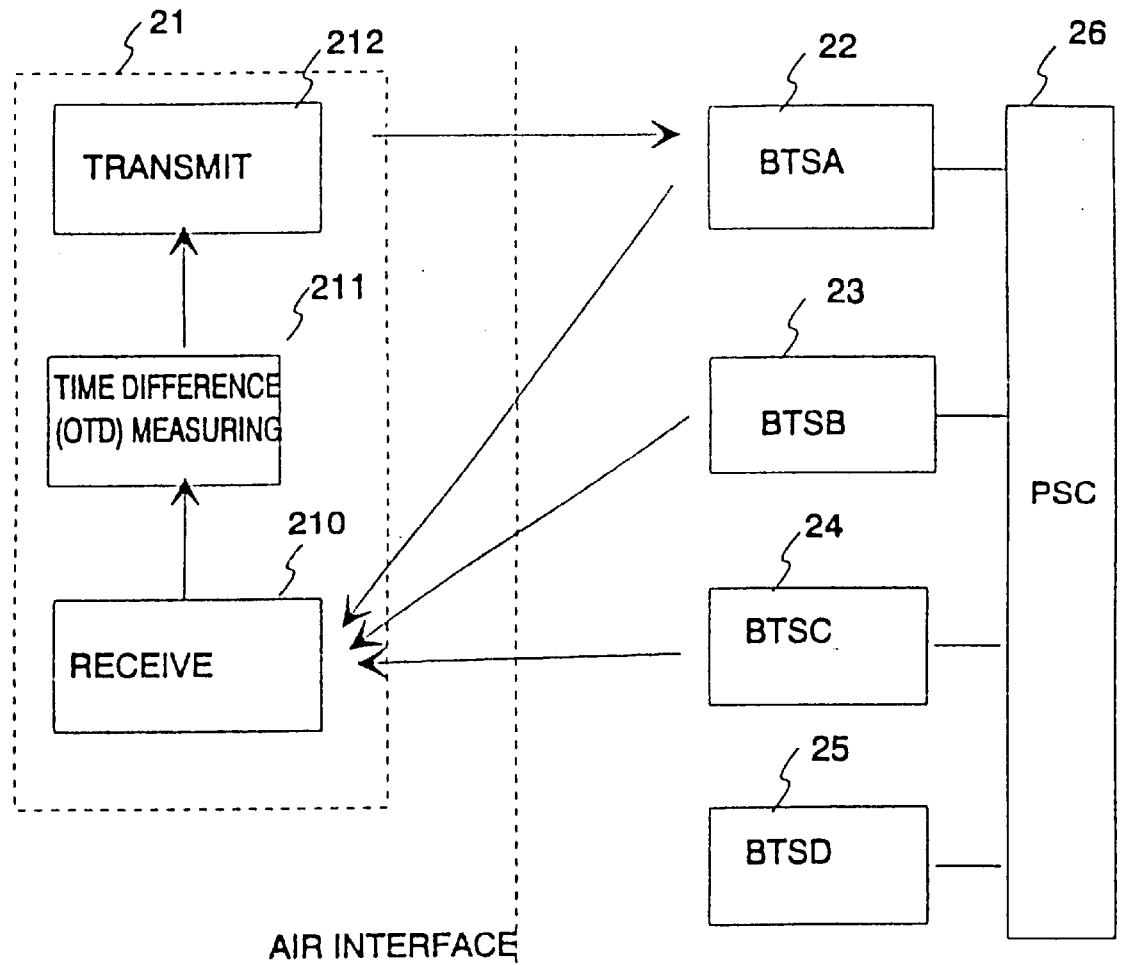
FIG. 3 shows a positioning system according to the invention in block diagram format.

FIG. 3 illustrates the operating principle of a positioning system according to the invention. It comprises a mobile communication system whereof the figure shows four base stations BTSA (22), BTSB (23), BTSC (24) and BTSD (25). A mobile station 21 receives signals from base stations BTSA, BTSB and BTSC in a receiving block 210. The mobile station measures the time differences of the signals received from the different base stations in block 211 and sends them to the transmission block 212 of the mobile station. The time difference measurement results are transmitted from the transmission block of the mobile station via the air interface to the base station 22 serving the mobile station 21. From the serving base station the time difference information is further transferred to the positioning service center PSC (26) of the mobile communication system, which calculates a position estimate for the mobile station on the basis of said time difference information and base station location coordinates and clocks. The positioning service center may be located in connection with other parts of the mobile communication system and it need not be a separate unit. In addition to the position measurement based on time difference, the system may employ other methods as well.

In the GSM system, the time difference between signals received from two base stations is called an observed time difference (OTD). Observed time difference measurement is used for synchronizing the mobile station to the clock of the new base station when the serving base station is changed, so the OTD measuring 5 method is known in the prior art. The OTD is measured in two steps because a mobile station cannot receive signals from two base stations simultaneously. First the mobile station measures a first time difference between the mobile station's own clock and the clock of the signal received from a first base station. Then the mobile station measures a second time difference between the mobile station and a second base station. The observed time difference OTD is obtained by calculating the difference of the first and second time differences. The OTD measurement is described in further detail in [4] prETS 300579: GSM05.10-version 4.4. 1, European digital cellular telecommunications system (Phase 2); Radio subsystem synchronisation, European Telecommunications Standards Institute, 1994, 14 pp.

The accuracy of position measuring can be improved by measuring the observed time difference for signals received from as many base stations as possible. However, in sparsely populated regions the distances between base stations are long, whereby a signal would have to be received from a base station located far away. Then the received signal may be weak. Weakness of a signal may also be caused by attenuating obstacles or low transmission power. Then the mobile station cannot decode the signal coming from the base station. In prior art solutions, a received signal is not used if the bit error rate of the bit sequence obtained by decoding remains below a predetermined value. Then an ordinary mobile station cannot measure the observed time difference OTD.

This problem can be solved according to the invention by having the mobile station detect the training sequences of signals that can be discerned but which remain below the signal level required for decoding. The solution is based on the fact that the observed time difference OTD needed in the positioning method can be determined with sufficient accuracy if the training sequence of the received undecoded signal can be detected by correlation measurement, thus determining its starting time. Then it is of no great importance, as regards the accuracy of the result, if the bit error rate of the decoded signal is poor. So, the method can be used to determine the observed time difference for more base stations than with prior art methods, thus improving the accuracy of position measuring. The method is particularly advantageous in a situation where there is a small number of base stations the signals of which exceed the lowest decoding level.

The timing value of a signal received from a base station can advantageously be measured using at least two received bursts instead of one. Using in the measurement training sequences extracted from multiple received bursts the measurement accuracy can be substantially improved. According to the prior art, the timing value is measured using a synchronization burst which usually has a long training sequence for that purpose. When using multiple bursts in timing measurement, it is advantageous to use, in addition to the synchronization bursts, also normal bursts which are used on traffic and control channels and which usually have a shorter training sequence. Since the occurrence frequency of normal bursts is considerably higher than that of synchronization bursts, the measurement can be performed quickly.

The aforementioned refined timing measurement is advantageously performed in two steps, wherein timing is first measured for one synchronization burst to obtain a timing estimate and then a second refined measurement is performed using at least two bursts. Advantageously, also normal bursts can be used in addition to possible synchronization bursts in the second measurement. The resolution of the second measurement is advantageously improved by interpolating the number of samples of the training sequence extracted from the burst so that it becomes higher. Increasing the number of samples increases the need for processing capacity, but this can be compensated for by utilizing the timing estimate obtained in the first measurement in determining the correlation calculation window. When using normal bursts for timing measurement, the mobile station has to know the training sequence used by the base station on that channel because there are 8 alternative training sequences used in normal bursts. As regards the channels used by the mobile station, the base station indicates the training sequence in use during call set-up. If the mobile station does not know the training sequence, it can determine the training sequence on the basis of a cross-correlation measurement by performing a cross-correlation alternately between the received training sequence and each optional training sequence.

Figure 4:
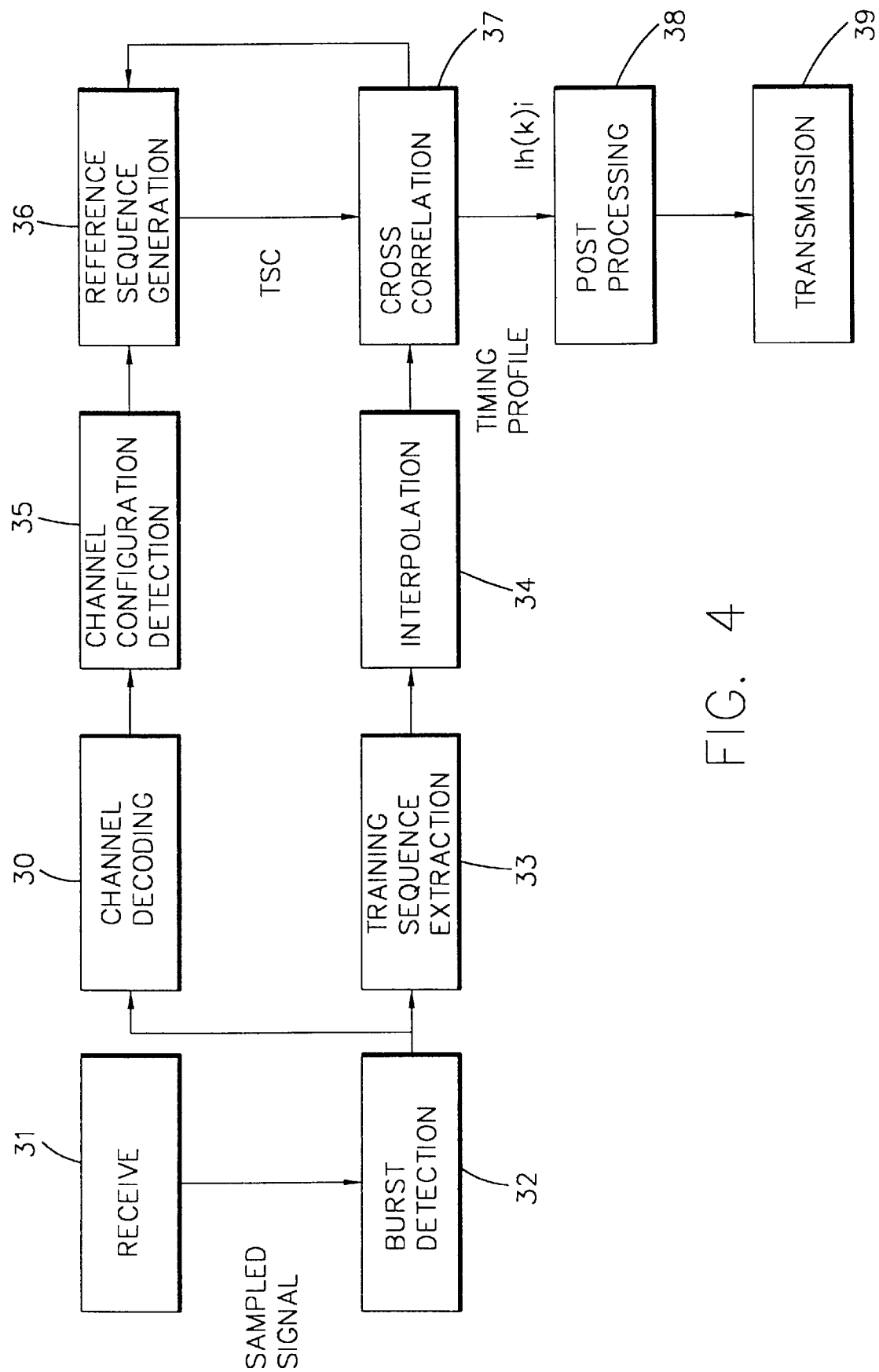
FIG. 4 shows a solution according to the invention for processing a signal in a mobile station.

FIG. 4 shows an arrangement according to the invention to process received signals in a mobile station. In the arrangement, a received signal is sampled in block 31 and the burst to be measured is extracted from the signal, block 32. The training sequence part is extracted from the burst in block 33 and this signal part is interpolated, block 34. The purpose of the interpolation is to increase the number of signal samples in order to improve the resolution. Control and traffic channel reception related to the normal operation of the phone is performed in block 30. In addition, information about the channel configuration used by the base station and particularly about the training sequence used is extracted from the base station parameters and commands received in conjunction with the normal operation of the phone in block 35. If the training sequence used by the system on the channel to be measured is known, that sequence is chosen as the sequence TSC used in the cross-correlation, block 36. The cross-correlation is performed between the interpolated training sequence extracted from the received signal and the selected training sequence TSC, block 37. The cross-correlation result is used to check in block 36 whether the selected training sequence TSC is the correct one. If the selection proves to be wrong, block 36 selects a new one from the training sequences used by the system until the right training sequence TSC is selected. When the correct training sequence has been found, the timing profile obtained as a cross-correlation result or possibly the timing profiles measured from multiple bursts are processed in block 38 to determine the timing estimate. Block 38 collects obtained measurement results, and the timing difference estimates are calculated as the difference of those estimates. The timing difference estimates are further sent to the base station in block 39.

Figure 5:
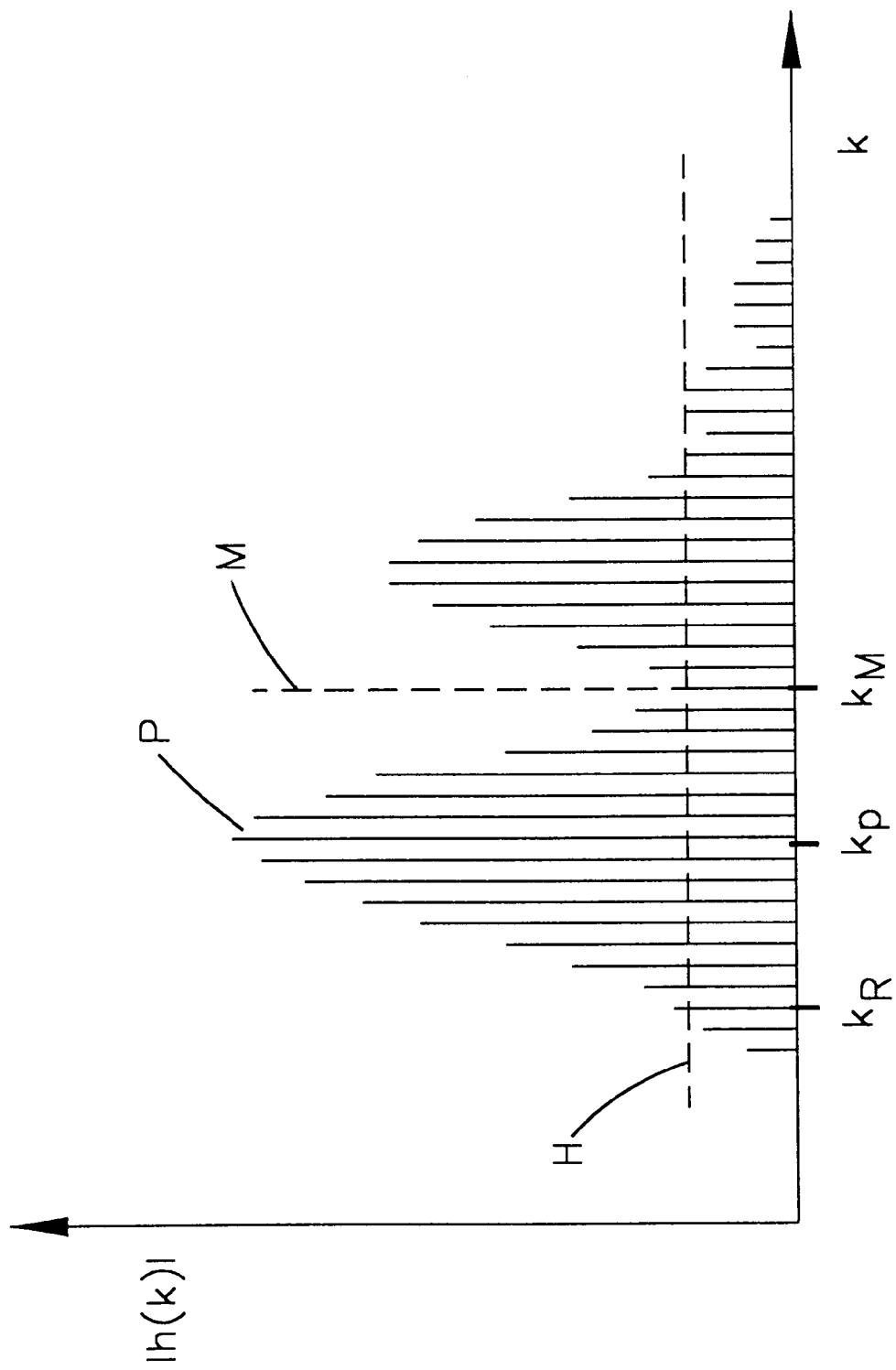
FIG. 5 shows a result from a cross-correlation measurement performed in a mobile station according to the invention.

FIG. 5 shows a timing profile obtained as a result of a cross-correlation between a received training sequence and the training sequences stored in the mobile station. Therein, a discrete time value $k_p$ corresponding to the maximum value P of the timing profile $|h(k)|$ is an estimate for the timing of the received training sequence. Below, it is described in more detail a method for determining the timing of a received signal.

Let the received signal, which is in the form of sampled data, be $x(n)=i(n)+j*q(n)$, where n is the ordinal number of the sample. This signal is interpolated to increase the number of samples, whereby the interpolated signal is $x^{40}$ (k), where $k=R*n$ and R is the interpolation ratio. This known signal interpolation method is described in more detail in [5] Discrete-Time Signal Processing, Alan V. Oppenheim and Ronald W. Shcafer, Prentice Hall, 1989, Chapter 3.6.2.

A known training sequence is modulated and interpolated to a higher sampling frequency. The result obtained corresponds to the ideal transmitted signal. Let this real-value signal be t(k).

The timing is then determined by calculating the impulse response estimate h(k) from the received interpolated signal x'(k):

$$h(k) = \sum_{i=0}^{N} x'(k+i) * t(k)$$

The amplitude |h(k)| of this impulse response is used in the timing measurement. An impulse response obtained in this way is shown in FIG. 5.

The first peak appearing in the impulse response amplitude usually represents the direct path of the signal while the other peaks represent reflected propagation paths. Since the direct propagation path is usually dominant in the impulse response, it is relatively easy to detect the first peak. In a noisy environment, however, the detection of the impulse response peak is more difficult. However, the detection inaccuracy can be compensated for by performing multiple measurements.

Below it is disclosed, with reference to FIG. 5, a simple algorithm to determine the first peak of the impulse response. First, it is found the first minimum M appearing after the first peak. This minimum amplitude is used as a threshold value H. Then the location of the first peak can be defined as the weighted average $k_p$ of the samples |h(k)| the amplitudes of which exceed the threshold value H and which come before the first minimum M:

$$k_p \approx \frac{\sum_{v=R}^{M} k_v * |h(k_v)|}{\sum_{w=R}^{M} |h(k_w)|}, \text{ where } |h(k_v)| > H| \text{ and } |h(k_w)| > H$$

Let p(l) be a series of peak detection results obtained from successive measurements. Since the peak detection method occasionally yields a peak corresponding to an erroneously reflected signal, there may sometimes be severe errors in the detection result p(l). Therefore, the results can be advantageously filtered using a median filter:

p'(l)=median(p(l),p(l+1), . . . ,p(l+L))

Since the error distribution is not symmetric, it is also possible to use a minimum filter to filter the results:

p''(l)=min(p'(l),p'(l+1), . . . ,p'(l+L'))

Optimal values for constants L and L' can be determined by simulation and/or experimentally.

Finally, the peak location estimates p''(m) can advantageously be averaged to reduce the effect of gaussian noise and frequency errors.

As the peak location estimates p''(m), m=1 . . . N are averaged, the error is diminished as follows. Let the variance of the results p''(m) be $\sigma_2$. According to the central limit theorem, the average of estimates p''(m) follows the normal distribution $N(\mu,\sigma^2/N)$, whereby the variance of the average is inversely proportional to the number N of averaged samples and the standard deviation of the average is inversely proportional to the square root $\sqrt{N}$ of the number N.

The positioning method described above requires that time difference information is transmitted from the mobile station to the base station. This is advantageously solved by using a modified signalling message according to the invention to transmit the information on a signalling channel. In the GSM system, the slow associated control channel (SACCH) is an appropriate signalling channel for this purpose.

According to the prior art, a message transmitted on the SACCH channel contains information about field strength measurements performed by the mobile station for signals from nearby base stations. In addition, the message contains information about the frequency at which the field strength measurement was performed and about the base station for which the measurement was performed. According to the invention, the message is encoded such that it contains information about time difference measurements in addition to the possible data mentioned above.

Use of the SACCH channel according to the invention for transmission of position information from a mobile station to a base station has several advantages:

Signalling channel measurement message is transmitted often, e.g. in the GSM system a SACCH burst is transmitted at intervals of 480 ms.

Transmission of information can be performed during a call.

Use of an already-specified channel for the transmission of position information does not increase the load on the radio interface nor deteriorate the quality of transmitted speech.

Use of the measurement message in the transmission of position information has not, however, substantial adverse effect since the measurement message can be encoded in a part of the message that is not continuously needed for another purpose.

Below there is presented an example of the transmission of position information according to the invention in the GSM system.

First, the communication network gives the mobile station the parameters for transmitting position information. These parameters include the repetition rate at which the position information is to be sent and the minimum number of neighbouring cells, say, three cells. The mobile station transmits the measurement report according to the invention e.g. as follows:

To indicate the modified structure of the measurement message, bit 8 of octet 3 in the measurement message is set to '1'.

The measurement message field NO-NCELL-M is set to indicate how many measurement messages are sent in the message. The number of measurement results is represented by variable N. This number must be bigger than the minimum number of measurements indicated by the system.

The mobile station uses the last 2*(6-N) measurement message octects to transmit the position information.

The method imposes no restrictions on the position information format used in the system.

The SACCH channel is used only during a call. When there is no active connection, the position information can be transmitted in connection with location updating, for example.

The method described above can be used for transmission of position information in other position location methods, too. In addition to the transmission of position information, the information transmission method described above can be used for transmission of other information as well.

The method according to the invention for determining the position of a mobile station has many advantages as compared to prior art methods:

Method sets no additional load on air interface.

Method sets no considerable additional load on mobile station processor.

Due to the factors mentioned above, positioning can be performed quickly and at short intervals.

Method is simple to introduce in existing networks, whereby changes in mobile stations and network are small.

Positioning algorithm updating can be performed without changes in mobile stations.

Method can be used in places where a mobile station is able to receive a signal from at least three base stations and to detect the training sequences of the signals.

Method can be used for positioning both stationary and moving mobile stations.

Since positioning is performed in a positioning service center, service users can be charged for the positioning services.

Positioning can be performed during a call without interfering with it, which is required in many applications, e.g. when using position information for a change of base stations.

Above it was described applications of the method according to the invention. Naturally, the principle according to the invention can be modified within the scope of the invention, as regards e.g. implementation details and fields of use.

Even though the application of the invention was described above in connection with the GSM system the invention can be applied in other digital communication systems as well, such as the DCS 1800/1900 (Digital Communications System at 1800/1900 MHz), the TDMA system used in the USA (US-TDMA) or the digital system used in Japan (JDC), for example. Similarly, the method according to the invention is not limited to the channel and burst types described above.

What is claimed is:

1. A method of determining position coordinates in a mobile communication system (26), including base stations (21, 22, 23), for locating a mobile station (21) therein comprising the steps of:

measuring, in the mobile station (21), an observed time difference (OTD) between signals received from at least two base stations (21, 22, 23) by the steps of:

receiving signals from a first (22) and a second base station (23), said signals containing bursts including information about training sequences used by the base stations;

measuring a first timing value between the mobile station's internal clock and the clock of the signal received from the first base station, and measuring a second timing value between the mobile station's internal clock and the clock of the signal received from the second base station, wherein said first and second timing values are measured by the steps of:

storing, in the mobile station, information about the training sequences used by the base stations;

extracting a burst from a received signal;

extracting a training sequence from the burst;

performing a cross-correlation measurement between the training sequence extracted from the burst and the training sequences having information stored in the mobile station;

calculating a point of time (kp) corresponding to the maximum (P) value of said cross-correlation measurement; and generating a timing value on the basis of said calculated point of time (kp);

calculating the difference between said first timing value and said second timing value; and using said difference as said observed time difference (OTD); and determining position coordinates for the mobile station (21) on the basis of said observed time difference (OTD) by the steps of:

transferring the time difference (OTD) from the mobile station (21) to the mobile communication system (22, 26); and calculating said position coordinates in the mobile communication system (26) on the basis of said time difference (OTD).

2. The method of claim 1, characterized in that an observed time difference (OTD) is measured in a mobile station (211) for signals received from base stations, whereby the strength of at least one received signal remains below the minimum decoding level of the mobile station.

3. The method of claim 1, characterized in that said time difference information is transferred from a mobile station (21) to a base station (22) encoded in one or more messages of a signalling channel (SACCH).

4. A mobile station positioning system comprising:

a mobile communication system which includes several base stations (22, 23, 24, 25) and mobile stations (21), characterized in that:

a mobile station (21) receives signals transmitted from at least two base stations (22, 23, 24), said received signals containing bursts including information about training sequences used by the base stations, and each mobile station comprises:

means for measuring the time differences between said received signals to obtain time difference information, said measuring means being arranged so as to extract a training sequence from a burst the strength of which remains below the decoding level of the mobile station; and means for sending said time difference information to a base station; and means, at the base station, for determining a position estimate for the mobile station (21) on the basis of said time difference information.

5. A mobile station (21) comprising:

means (210) for receiving signals from at least two base stations (22, 23, 24), said received signals containing bursts including information about training sequences used by the base stations;

means (211) for performing a time difference measurement for said signals to obtain time difference results, said performing means being arranged so as to extract a training sequence from a burst the strength of which remains below the decoding level of the mobile station; and means (212) for transmitting said time difference results or information deduced from them from the mobile station to a base station.

6. The mobile station of claim 5, characterized in that it comprises means (212) for transmitting said time difference information to a base station on a signalling channel (SACCH).

7. A mobile station comprising: means (210) for receiving signals from at least two base stations (22, 23, 24), said received signals containing bursts including information about training sequences used by the base stations;

means for measuring the timing of a received signal on the basis of training sequences extracted from at least two bursts;

means (211) for performing a time difference measurement for said signals using said timing to obtain time difference results; and means (212) for transmitting said time difference results or information deduced from them from the mobile station to a base station.

8. The mobile station of claim 7 characterized in that it comprises means (212) for transmitting said time difference information to a base station on a signalling channel (SACCH).

9. A mobile station positioning system comprising:
- a mobile communication system including several base stations (22, 23, 24, 25) and mobile stations (21), characterized in that:
- a mobile station (21) receives signals transmitted from at least two base stations (22, 23, 24), said received signals containing bursts including information about training sequences used by the base stations, and each mobile station comprises:
  - means for measuring the time differences between said received signals to obtain time difference information, said measuring means measuring the timing of a received signal on the basis of training sequences extracted from at least two bursts; and
  - means for sending said time difference information to a
  - base station; and
- means, at the base station, for determining a position estimate for the mobile station (21) on the basis of said time difference information.

* * * * *